(12) United States Patent
Correa Bahnsen et al.

(10) Patent No.: US 11,314,860 B2
(45) Date of Patent: Apr. 26, 2022

(54) ANTI-IMPERSONATION TECHNIQUES USING DEVICE-CONTEXT INFORMATION AND USER BEHAVIOR INFORMATION

(71) Applicant: Easy Solutions Enterprises Corp., Doral, FL (US)

(72) Inventors: Alejandro Correa Bahnsen, Bogota (CO); Luis David Camacho Gonzalez, Bogota (CO); Claudio Deiro, Bogota (CO); Martin Ochoa Ronderos, Bogotá D.C. (CO); Jesus Alberto Solano Gomez, Bogotá D.C. (CO); Javier Fernando Vargas Gonzalez, Bogota D.C. (CO)

(73) Assignee: Easy Solutions Enterprises Corp., Doral, FL (US)

( * ) Notice: Subject to any disclaimer, the term of this patent is extended or adjusted under 35 U.S.C. 154(b) by 291 days.

(21) Appl. No.: 16/424,856

(22) Filed: May 29, 2019

(65) Prior Publication Data
US 2020/0380119 A1 Dec. 3, 2020

(51) Int. Cl.
*G06F 21/55* (2013.01)
*G06N 20/00* (2019.01)
*G06F 21/56* (2013.01)

(52) U.S. Cl.
CPC ......... *G06F 21/554* (2013.01); *G06F 21/552* (2013.01); *G06F 21/566* (2013.01); *G06N 20/00* (2019.01)

(58) Field of Classification Search
CPC .... G06F 21/552; G06F 21/554; G06F 21/566; G06F 21/30; G06F 21/316; G06F 21/50; G06F 21/55; G06F 21/45; G06N 20/00; G06N 20/20; G06N 5/003; H04L 9/32; H04L 63/08; H04L 63/102; H04L 67/306; H04L 67/22
See application file for complete search history.

(56) References Cited

U.S. PATENT DOCUMENTS 9,516,035 B1 * 12/2016 Moritz ................ H04L 63/0861

* cited by examiner

*Primary Examiner* — Olugbenga O Idowu
(74) *Attorney, Agent, or Firm* — Greenberg Traurig

(57) ABSTRACT

Anti-impersonation techniques using device-context information and user behavior information from a session. The session can include a time period where a user of the client computer is performing an activity on the client computer (e.g., the session includes the user logging into an account online). The behavior information can include information on ways the user uses user input devices during the session. The device-context information can include HTTP session information. The techniques can include generating feature vector(s) for the received information, and comparing the feature vector(s) against model(s) of related historical information. The comparisons can provide level(s) of deviation of the feature vector(s) from the model(s). Also, the techniques can include determining whether the session is anomalous or normal according to the level(s) of deviation, and performing a security action in response to determining the session is anomalous.

20 Claims, 12 Drawing Sheets

| 100 | | | |
|---|---|---|---|
| Approach | Simple attack | Context simulation | Physical attack |
| *Context analytics* | Effective | Partially effective | Ineffective |
| *Behavioural dynamics* | Partially effective | Partially effective | Partially effective |
| *Combination* | Effective | More effective than single approaches. | Partially Effective |

FIG. 1

| 200 | | |
|---|---|---|
| Approach | New machine | User travels |
| *Context analytics* | Likely FP | Likely FP |
| *Behavioural dynamics* | Likely Accurate | Accurate |
| *Combination* | Likely Accurate | Accurate |

Receiving, from a client computer, device-context information from a session (e.g., a session can include a time period where a user is performing an activity on the client computer—such as a time period including the user logging into an account)
402

↓

Receiving, from the client computer, user behavior information from the session (the user behavior information can include information on ways the user uses user input devices during the session)
404

↓

Generating a first feature vector for the device-context information and a second feature vector for the user behavior information
406

↓

Comparing the first feature vector against a first model of historical device-context information to provide a first level of deviation of the first feature vector from the first model
408

↓

Comparing the 2nd feature vector against a 2nd model of historical user behavior info. provide a second level of deviation of the second feature vector from the second model
410

↓

Determining whether the session is anomalous or normal according to the first level of deviation and the second level of deviation
412

↓

Performing a security action in response to determining the session is anomalous
414

{I, O, P, J, K, L, N, M} → RIGHT
{R, T, Y, U, F, G, H, V, B} → CENTER
{Q, W, E, A, S, D, Z, X, C} → LEFT
{0, 1, 2, 3, 4, 5, 6, 7, 8, 9} → DIGIT

900

$$FeatureHistMean_j = \frac{\sum_J FeatureHist_j}{|J|}$$

$$FeatureDist_i = \frac{Feature_i - FeatureHistMean_i}{\sigma(FeatureHist_i)}$$

FIG. 10

ANTI-IMPERSONATION TECHNIQUES USING DEVICE-CONTEXT INFORMATION AND USER BEHAVIOR INFORMATION

TECHNICAL FIELD

Embodiments of the disclosure relate generally to anti-impersonation techniques using device-context information and user behavior information.

BACKGROUND

With the increasing popularity of web services and cloud-based applications, there has been an increase on attacks to those platforms. Several known attacks have involved stealing of authentication credential to services. In addition to this, passwords are often the target of malware.

In order to improve the security of password-based authentication in web applications, it is a common industry practice to profile users based on device context, such as Internet Protocol (IP) ranges and web browser type. However, attackers have found workarounds for security mechanisms that profile users based on device context.

Also, to improve the security of password-based authentication in web applications, behavioral dynamics (such as mouse and keyword use) has been proposed and possibly used. However, behavioral dynamics has been shown to be effective when the dynamics can be recorded for a substantial period of time that exceeds a typical user authentication process.

More specifically, to mitigate the risk posed by attackers impersonating legitimate users by means of compromised or guessed credentials, many applications use mechanisms to detect anomalies by analyzing the connection features such as incoming IP address, browser and OS type as read by Hypertext Transfer Protocol (HTTP) headers, among other parts of HTTP communications. However, there are some limitations of those defense mechanisms. For example, if the anomaly detection is too strict, there could be false positives that can interfere with user experience. On the other hand, if a careful attacker manages to bypass such context-related filters, for instance by manipulating HTTP parameters, using virtual private network (VPN) services, or using a victim's machine, then such countermeasures can fall short of providing security.

Behavioral biometrics have also been used in strategies to enhance the security of both web and desktop applications. Behavioral biometrics have shown to work with reasonable accuracy in the context of continuous authentication or within substantial periods of time for recording behavioral biometrics. In other words, the monitoring time of mouse and/or keyboard activity and other forms of behavioral biometrics need to be long enough. In the context of user authentication, where interaction during log-in time with users is limited, such methods are less accurate and may be impractical. Current online services can rely on third parties for security related functionality. In domains handling sensitive data such as banking data, those services are often only allowed to interact with a user's session during or before log-in, but not post-login. Therefore, improving authentication is a practical challenge with behavioral biometrics.

SUMMARY

Examples of the systems and methods disclosed herein for implementing anti-impersonation techniques using user behavior information and device-context information (e.g., device hardware information, web browser information, HTTP header information, IP address, etc.) provide specific technical solutions to at least the technical problems mentioned in the background section and other parts of the application as well as other technical problems not described herein but recognized by those of skill in the art.

The disclosed techniques herein combine the capturing of device-context information and user behavior information in a session, such as a user authentication session, to increase security for user authentication mechanisms and methods. The techniques can use machine learning that aims at high accuracy, and only occasionally raises alarms for manual inspection.

The anti-impersonation techniques described herein can use received device-context information and user behavior information from a session. The session can include a time period where a user of a client computer is performing an activity on the client computer (e.g., the session includes the user logging into an account online). The behavior information can include information on ways the user uses user input devices for the client computer during the session. The device-context information can include HTTP session information and other information retrieved from a browser as well as hardware identifying information. The techniques can include generating one or more feature vectors for the received information, and comparing the feature vector(s) against one or more models of related historical information. The comparisons can provide one or more levels of deviation of the feature vector(s) from the model(s). Also, the techniques can include determining whether the session is anomalous or normal according to the level(s) of deviation, and performing a security action in response to determining the session is anomalous.

Some of the technologies described herein include a computer system. The computer system can implement the features and operations of the aforesaid methods and the aforesaid medium. The medium can specifically be implemented by memory of the system. The computer system can also include the processing device.

BRIEF DESCRIPTION OF THE DRAWINGS

The present disclosure will be understood more fully from the detailed description given below and from the accompanying drawings of various embodiments of the disclosure.

FIG. 1 depicts a table that shows example security strategies versus attacker approaches.

FIG. 2 depicts a table that shows example security strategies versus benign context changes.

FIGS. 4, 11, 12, and 13 are each flow diagrams of example methods for implementing anti-impersonation using device-context information and user behavior information from a session, in accordance with some embodiments of the present disclosure.

FIG. 9 depicts equation 900, which can be used to determine an example average of historical data of sessions, in accordance with some embodiments of the present disclosure.

FIG. 10 depicts equation 1000, which can be used to compare a given session against session history data, in accordance with some embodiments of the present disclosure.

DETAILED DESCRIPTION

Figure 3:
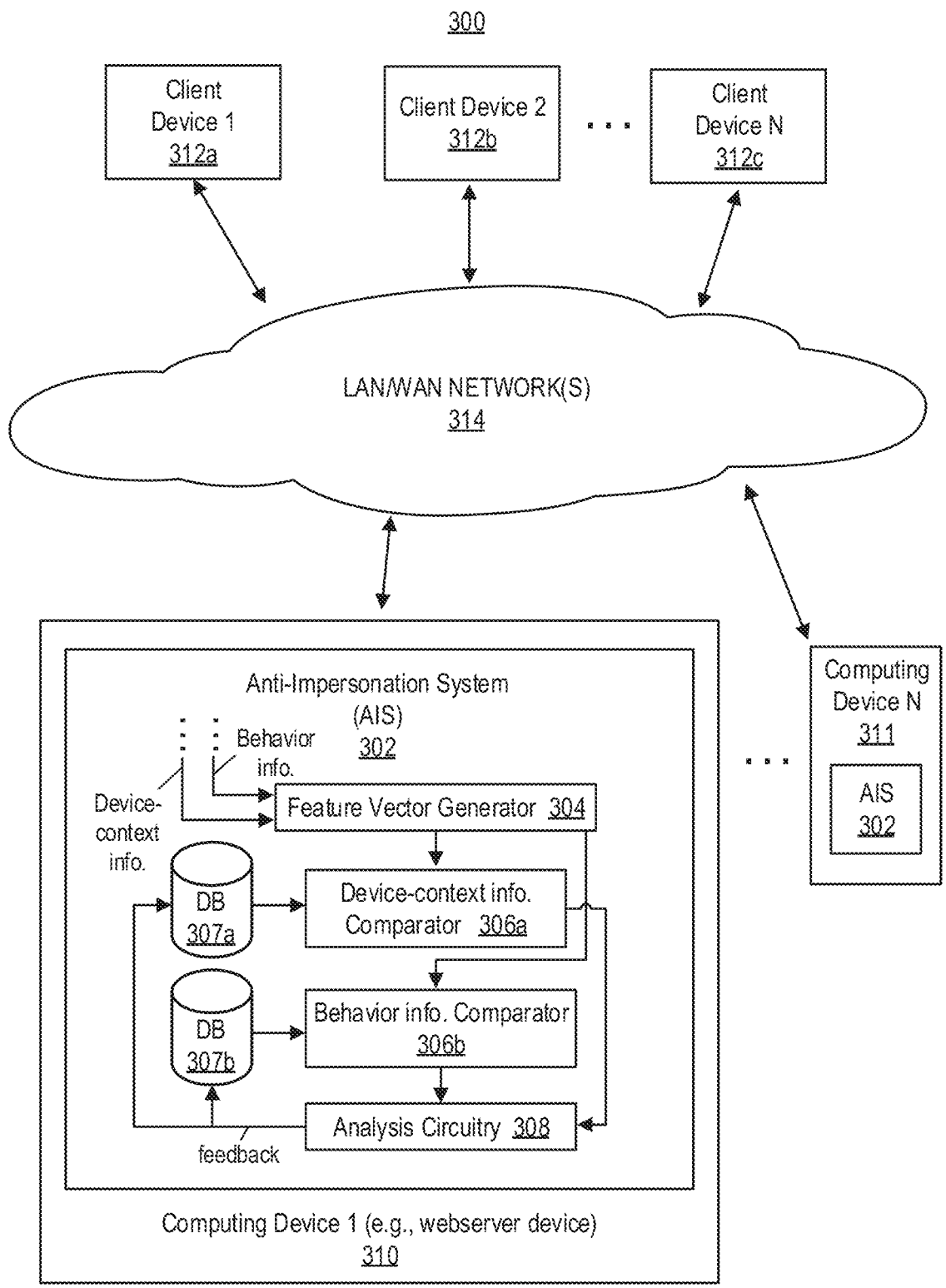
FIG. 3 illustrates an example network of computer systems to implement technologies for anti-impersonation using device-context information and user behavior information from a session, in accordance with some embodiments of the present disclosure.

The disclosed techniques herein combine the capturing of device-context information and user behavior information in a session, such as a user authentication session, to increase security for user authentication mechanisms and methods. The techniques can use machine learning that aims at high accuracy, and only occasionally raises alarms for manual inspection.

The technical solutions disclosed herein address the shortcomings of individual context-based risk assessment techniques by synergistically using machine-learning based methods to detect anomalies in both device-context information (e.g., OS type, browser type, country of origin of IP, etc.) and user behavior information of a given user session (such as a session at login time). In some embodiments, by using models that take into account several features of a browser, operating system, Internet connection, connection times, and keystroke and mouse dynamics, the system can gain more confidence on the legitimacy of a given session (such as a given log-in attempt). The models disclosed herein can be based on previous log-in attempts in order to evaluate the risk associated with a new log-in attempt. In some embodiments, the models can combine historical device-context information (e.g., historical device hardware information, historical web browser information, historical HTTP header information, historical IP address, etc.) and historical user behavior data to detect anomalies during authentication based partially on real data (such as real data from an available dataset and/or a web domain).

User authentication has been traditionally based on passwords or passphrases which are meant to be secret. However, secrets can be stolen or guessed. And, improving authentication in web applications without further authentication mechanisms provides an opportunity for attackers to impersonate a victim and steal sensitive information. To avoid this, the implementation of risk based authentication has allowed traditional authentication systems to increase confidence on a given user's identity by analyzing not only a shared secret, but other features, such as device characteristics or user interaction. For example, device fingerprinting and behavioral biometrics can be used.

As illustrated in FIG. 1, table 100 summarizes effectiveness of various strategies in detecting attacks, and also highlights a possible outcome using the techniques disclosed herein (such as the systems and methods of FIGS. 3-14). The illustrated combined model can recognize both changes in device context and changes in user behavior. Table 100 assumes there can always be impersonation and thus always changes in behavior. In summary, table 100 shows strategies of the techniques versus attack approaches.

As illustrated in FIG. 2, table 200 highlights the potential misclassification of the various approaches in various scenarios. Also, table 200 summarizes example expectations of the combination of both approaches in terms of reducing false positives. False positive is labeled "FP" in table 200. When a user uses a new device, it is expected its behavior to be similar in terms of keystrokes and mouse dynamics (although not exact). When the user travels, it should remain similar (but not exact). Such data can compensate for possible false positives from the device-context information analysis.

Figure 7:
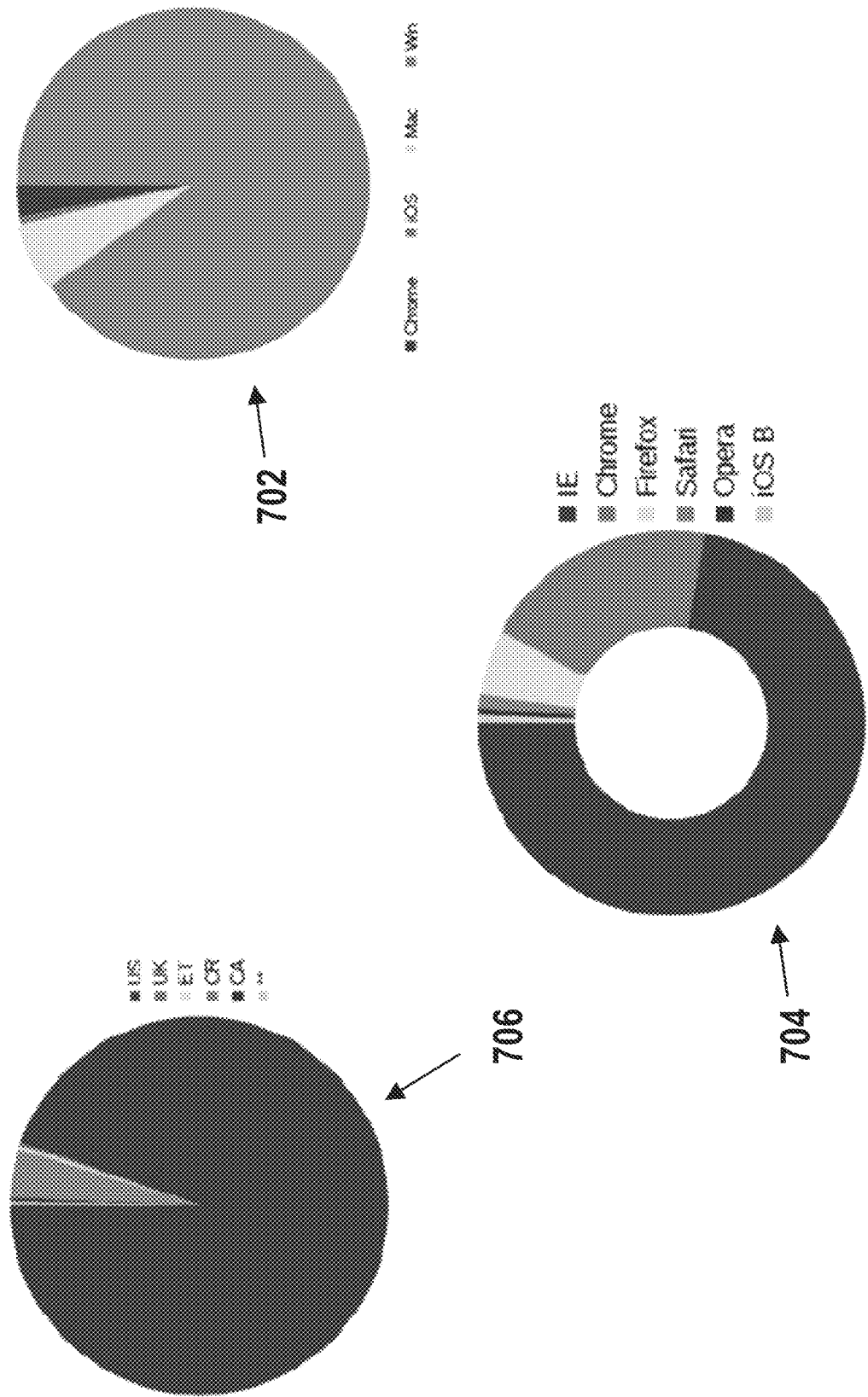
FIG. 7 depicts example variable contexts of a user with heterogenous access patterns, in accordance with some embodiments of the present disclosure.

The device-context information can include heterogenous access patterns such as from multiple devices or operating systems (e.g., see pie chart 702 shown in FIG. 7), multiple browsers (e.g., see pie chart 704), and multiple locations (e.g., see pie chart 706) due to travel (as depicted in FIG. 7 for a user having hundreds of access records). And, the time of activity considered for behavioral interaction can reflect the average time of a password based log-in (which can be between 25 and 30 seconds). Because of the breadth of such factors, single models are not as effective within a global context attack, but such models can be used in synergy to produce a better model.

A benefit of the methods and systems illustrated through FIGS. 3-14 is to overcome the shortcomings of the single risk assessment strategies by obtaining a single model or single set of combined models that take into account multiple strategies (e.g., combining device-context information and user behavior information). Also, the methods and systems illustrated through FIGS. 3-14 provide specific technical solutions to at least the technical problems mentioned in the background section and other parts of the application as well as other technical problems not described herein but recognized by those of skill in the art.

FIG. 3 illustrates an example network of computer systems 300 to implement technologies for anti-impersonation using device-context information and user behavior information from a session, in accordance with some embodiments of the present disclosure. The example network of computer systems 300 can implement any of the aforesaid components and operations as well as any component or operation described herein.

The network of computer systems 300 is shown including an anti-impersonation system 302 (or AIS 302). The AIS 302 is shown including feature vector generator 304, device-context information comparator 306a, behavior information comparator 306b, databases 307a and 307b, and analysis circuitry 308. As shown in FIG. 3, AIS 302 can be hosted on one more computers (e.g., see computing devices 310 and 311). It is shown that the feature vector generator 304 provides output data to the comparators 306a and 306b, which the comparators use as input. Also, it is shown that the comparators 306a and 306b provide output data to the analysis circuitry 308, which the analysis circuitry uses as inputs. The feature vector generator 304 is shown receiving input data from multiple sources (e.g., databases 307a and 307b as well as additional sources such as from client devices 312a, 312b, and 312c). As shown, the input data from the client devices includes device-context and behavior information from respective sessions of the client devices. Also, as shown, feedback from the analysis circuitry 308 can be provided to the databases that feed the feature vector generator 304. For example, FIG. 3 shows the circuitry 308 providing feedback to databases 307a and 307b. The feedback can be the output of analysis circuitry 308, a derivative of the output, or intermediate data within a calculation of the analysis circuitry.

The network of computer systems 300 is also shown including client devices that can receive data from AIS 302 as well as communicate data to AIS 302 (e.g., see client devices 312a, 312b, and 312c). Client devices, which are communicatively coupled with the AIS 302 via one or more LAN/WAN networks 314, can transmit normal, anomalous, and/or spoofed communications to the devices having the AIS 302 through the network(s) 314.

The network of computer systems 300 is also shown including the LAN/WAN network(s) 314 which are shown communicatively coupling the computing devices hosting AIS 302 and the client devices. The LAN/WAN network(s) 314 can include one or more local area networks (LAN(s)) and/or one or more wide area networks (WAN(s)). The LAN/WAN network(s) 314 can include the Internet and/or any other type of interconnected communications network. The LAN/WAN network(s) 314 can also include a single computer network or a telecommunications network. More specifically, the LAN/WAN network(s) 314 can include a local area network (LAN) such as a private computer network that connects computers in small physical areas, a wide area network (WAN) to connect computers located in different geographical locations, and/or a metropolitan area network (MAN)—also known as a middle area network—to connect computers in a geographic area larger than that covered by a large LAN but smaller than the area covered by a WAN.

At least each shown component of the network of computer systems 300 can be or include a computer system which can include memory that can include media. The media can include or be volatile memory components, non-volatile memory components, or a combination of such. In some embodiments, the memory is a storage system. An example of a storage system is a SSD. In some embodiments, the memory is a hybrid memory/storage sub-system. In general, each of the computer systems can include a host system that uses the memory. For example, the host system can write data to the memory and read data from the memory.

The host system can be a computing device such as a desktop computer, laptop computer, network server, mobile device, or such computing device that includes a memory and a processing device. The host system can include or be coupled to the memory so that the host system can read data from or write data to the memory. The host system can be coupled to the memory via a physical host interface. The physical host interface can provide an interface for passing control, address, data, and other signals between the memory and the host system.

A memory system controller (hereinafter referred to as "controller") can communicate with the memory components to perform operations such as reading data, writing data, or erasing data at the memory components and other such operations. The controller can include hardware such as one or more integrated circuits and/or discrete components, a buffer memory, or a combination thereof. The controller can be a microcontroller, special purpose logic circuitry (e.g., a field programmable gate array (FPGA), an application specific integrated circuit (ASIC), etc.), or other suitable processors. The controller can include a processor (processing device) configured to execute instructions stored in local memory. The local memory of the controller can include an embedded memory configured to store instructions for performing various processes, operations, logic flows, and routines that control operation of the memory, including handling communications between the memory and the host system. In general, the controller can receive commands or operations from the host system and can convert the commands or operations into instructions or appropriate commands to achieve the predetermined desired access to the memory components.

The memory can also include additional circuitry or components. In some embodiments, the memory can include a cache or buffer (e.g., DRAM) and address circuitry (e.g., a row decoder and a column decoder) that can receive an address from the controller and decode the address to access the memory components.

In some aspects of the present disclosure, the memory includes the AIS 302. In some embodiments, the controller includes at least a portion of the AIS 302. For example, the controller can include a processor (processing device) configured to execute instructions stored in local memory for performing the operations described herein such as the operations described herein associated with the AIS 302. In some embodiments, the AIS 302 is part of the host system, an application, or an operating system.

The AIS 302 can use the memory, the memory components, and the host system to implement technologies for performing anti-impersonation using device-context information and user behavior information.

Further details with regards to the operations of the AIS 302 are described below. As shown in FIG. 3, the network of computer systems 300 can include the AIS 302.

In some embodiments, such as the one shown in FIG. 3, the feature vector generator 304 of the AIS 302 is configured to receive, from a client computer (e.g., client device 312a, 312b, or 312c), device-context information from a session. The session can include a time period where a user of the client computer is performing an activity on the client computer. For example, the session can include the time period of the user logging into an account. The device-context information can include HTTP session information. The feature vector generator 304 of the AIS 302 can also be configured to receive, from the client computer, user behavior information from the session. The user behavior information can information on ways the user uses user input devices of the client computer during the session. Also, in some embodiments, the session can include a login session. Alternatively, in some embodiments, the session can only include a login session.

The feature vector generator 304 of the AIS 302 can also be configured to generate a first feature vector for the device-context information and a second feature vector for the user behavior information. As shown, the feature vector generator 304 can output the first feature vector to the device-context information comparator 306a and the second feature vector to the behavior information comparator 306b.

In some embodiments, such as the one shown in FIG. 3, the device-context information comparator 306a of the AIS 302 is configured to compare the first feature vector against a first model of historical device-context information from previous sessions of the user or other users. The previous sessions can be related to the session. The comparison of the first feature vector against the first model can provide a first level of deviation of the first feature vector from the first model. In some embodiments, such as the one shown in FIG. 3, the behavior information comparator 306b of the AIS 302 is configured to compare the second feature vector against a second model of historical user behavior information from the previous sessions. The comparison of the second feature vector against the second model can provide a second level of deviation of the second feature vector from the second model.

In some embodiments, such as the one shown in FIG. 3, the analysis circuitry 308 of the AIS 302 is configured to determine whether the session is anomalous or normal according to the first level of deviation and the second level of deviation. The analysis circuitry 308 is also configured to output the determination of whether the session is anomalous or normal to one or more components of one or more computing devices (e.g., one or more components of computing device 310, computing device 311, client device 312a, client device 312b, and/or client device 312c) so that the one or more components of the one or more computing devices can perform a security action in response to the analysis circuitry 308 of the AIS 302 determining that the session is anomalous. The one or more components of the one or more computing devices that are configured to perform the security action in response to the analysis circuitry 308 determining whether the session is anomalous or normal can be a part of the AIS 302 as well.

In some embodiments, the feature vector generator 304 of the AIS 302 is configured to generate a combined feature vector have the first feature vector and the second feature vector as components of the combined feature vector. In such embodiments, one or more comparators, such as one or more of the comparators 306a and 306b of the AIS 302, can be configured to compare the combined feature vector against a combined meta-model of the historical device-context information and the historical user behavior information from the previous sessions. The comparison by the one or more comparators can be configured to provide a combined level of deviation of the first feature vector from the first model and the second feature vector from the second model. Also, in such embodiments, the analysis circuitry 308 of the AIS 302 can be configured to determine whether the session is anomalous or normal according to the combined level of deviation, and then output the determination to one or more components of one or more computing devices of the AIS 302 or another system.

In some embodiments, the feature vector generator 304 of the AIS 302 is configured to generate a parametric linear combination according to the first level of deviation and the second level of deviation. The analysis circuitry 308 can be configured to determining whether the session is anomalous or normal according to the parametric linear combination. The parametric linear combination can include a prediction of the first model and a prediction of the second model. And, the predictions of the models can be defined by $\hat{y}_c$, $\hat{y}_b \in [0, 1]$. The analysis circuitry 308 can be configured to unify the predictions of the models using a linear convex combination. The linear convex combination can be defined by $\hat{y}_t = \alpha_c \hat{y}_c + \alpha_b \hat{y}_b$, and wherein $\alpha_c$, $\alpha_b \in [0,1]$ are the coefficient parameters of each model. In such examples, the summation of the coefficient parameters equals one or one hundred percent, e.g., $\alpha_c + \alpha_b = 1$.

In some embodiments, the device-context information comparator 306a can be configured to compare the first feature vector against the first model to provide the first level of deviation prior to the behavior information comparator 306b comparing the second feature vector against the second model to provide the second level of deviation. In such embodiments, the analysis circuitry 308 can be configured to determine whether the session is anomalous or normal according to the first level of deviation only. The analysis circuitry 308 can also be configured to output the determination to one or more components of one or more computing devices of the AIS 302 or another system so the one or more components can perform the security action in response to determining the session is anomalous according to the first level of deviation. In such examples, the security action can occur without the determination that the session is anomalous or normal according to the second level of deviation.

In some embodiments, the behavior information comparator 306b can be configured to compare the second feature vector against the second model to provide the second level of deviation prior to the device-context information comparator 306a comparing the first feature vector against the first model to provide the first level of deviation. In such embodiments, the analysis circuitry 308 can be configured to determine whether the session is anomalous or normal according to the second level of deviation only. The analysis circuitry 308 can also be configured to output the determination to one or more components of one or more computing devices of the AIS 302 or another system so the one or more components can perform the security action in response to determining the session is anomalous according to the second level of deviation. In such examples, the security action can occur without the determination that the session is anomalous or normal according to the first level of deviation.

In some embodiments, a component of the AIS 302 (such as the device-context information comparator 306a or a part of the database 307a) can be configured to generate the first model using machine learning. Also, a component of the AIS 302 (such as the behavior information comparator 306b or a part of the database 307b) can be configured to generate the second model using machine learning. For example, the generating of each one of the first and second models can include using random decision forests.

In some embodiments, the generating of the first and second models can include generating a respective set of ratios of observations for each of the first and second models. And, each ratio of observations for a field of a feature category can be divided by a summation of all observations of the feature category. Also, the generating of the first and second models can include normalizing each ratio of observations in the first and second models. In some example, for each feature category that is cyclical (e.g., temporal categories), the generating of the first and second models can include determining closeness of different fields in the feature category using convolution.

In some embodiments, the first and second models can be generated by components of databases or a database management system including the databases (such as components of databases 307a and 307b). In such examples, the analysis circuitry 308 can provide feedback to the components of databases or a database management system including the databases. And, the analysis circuitry 308 and/or the databases or the database management system can be configured to update the first model according to the first feature vector and the second model according to the second feature vector. The updating of the first and second models can occur after the comparisons of the first feature vector against the first model and the second feature vector against the second model by the respective comparators 306a and 306b.

FIGS. 4, 11, 12, and 13 are flow diagrams of example methods that can be implemented by parts of the network of computer systems 300, in accordance with some embodiments of the present disclosure. The respective methods 400, 1100, 1200, and 1300 in FIGS. 4, 11, 12, and 13 can each be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the methods can be performed by one or more aspects of the AIS 302. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

FIG. 4 is a flow diagram of an example method 400 for implementing anti-impersonation using device-context information and user behavior information from a session, in accordance with some embodiments of the present disclosure.

At block 402, the method 400 includes receiving from a client computer, by one or more computing devices, device-context information from a session. The session can include a time period where a user of the client computer is performing an activity on the client computer. For example, the session can include the user logging into an account online. In some embodiments, the receiving in block 402 can be performed by the feature vector generator 304.

The gathering the device-context information (such as context information including HTTP information) can include device fingerprinting. Device fingerprinting is an identification technique that can be used for user tracking and authentication purposes. Device fingerprinting can include gathering characteristics of a device that uniquely identify the device. The output of device fingerprinting can include a device profile. In other words, device fingerprinting can generate a device profile. Device fingerprinting can also include creating an identifier based on hardware signatures.

Acquiring the signatures can require high level privileges on the device, which can be a limitation of typical device fingerprinting. However, with the popularization of the Internet and increased browser capabilities it has become possible to use statistical identification techniques using information gathered from a web browser running on the device. For example, the fingerprinting can include retrieving browser history, installed plugins, supported media types, user agents, and network information. Network information can include HTTP headers, timestamps, origin IP and geolocation. In some embodiments, geolocation can be either collected using HTML5 or approximated from an IP address by using known services.

Gathering browser information instead of a combination of browser and hardware information can be limiting but efficient. It is known that using web browser information alone, such as HTTP information alone, can be relatively easy to spoof. Thus, fingerprinting can include combining both hardware and statistical analysis and gathering the information using the web browser capabilities. In some embodiments, the fingerprinting can use HTML5 and JavaScript APIs to measure the execution time of common JavaScript functions and the final result of rendering images as hardware signatures. The measurements can be compared to a base line of time execution and rendering performed in known hardware used as control.

The output of device fingerprinting can also be used to generate corresponding models used by the system (e.g., see operation at block 408 which uses a model of historical device-context information).

At block 404, the method 400 includes receiving from the client computer, by the one or more computing devices, user behavior information from the session. The user behavior information can include information on ways the user uses user input devices during the session. In some embodiments, the receiving in block 404 can be performed by the feature vector generator 304.

Another authentication technique is behavioral dynamics analysis, such as end user behavioral analysis based on mouse and keyboard dynamic statistics. Also, such an analysis can be based on specific variables related to user interactions with a touchscreen, such as specific variables that make up different user interactions and gestures with a touchscreen. Variables for user interaction with a touch screen can include the speed in which a user moves a finger on a touchscreen or touches and releases the screen for certain types of gestures and interactions, area of a user's finger that contacts the screen, and time duration of pauses between user gestures with the screen.

Figures 5, 6:
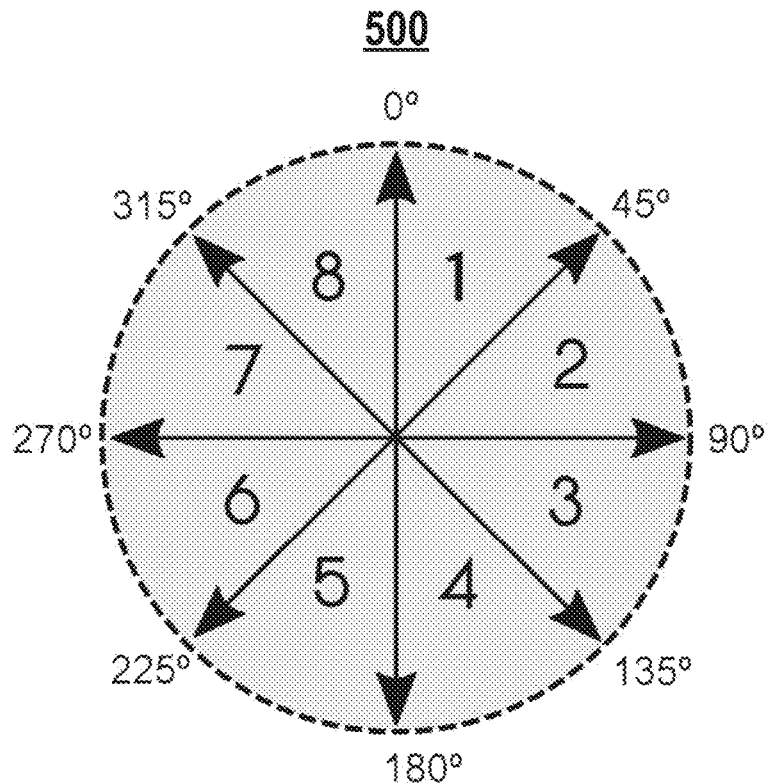
FIG. 5 is an illustration of example space segmentation to calculate mouse movement features, in accordance with some embodiments of the present disclosure.
FIG. 6 is an illustration of example keyboard mapping to anonymize sensitive information, in accordance with some embodiments of the present disclosure.

The user behavior information can include the output of behavioral analysis. The measuring of user behavior can include transforming human-computer interactions into numerical, categorical and temporal information which can be included in the behavior information received in block 404. The common interactions gathered for a behavioral model are key-strokes, mouse movements and mouse clicks. For instance, common features extracted from keyboard events are keys pressed and keys released, together with corresponding time-stamps. For mouse, cursor position, and click coordinates, timestamps can be used. Such features can be processed and aggregated to a user profile of user behavior. FIG. 5 shows space segmentation 500 to calculate mouse movement features. FIG. 6 shows keyboard mapping 600.

The behavior information can include unique characteristics of each user such as how fast the user types, how many special keys the user uses, what is the proportion of use of mouse and keyboard, how long the user stops interacting before finishing an activity. This is useful because such information can be used to fingerprint the user. In some embodiments, the behavior information can help the system distinguish a user who uses mainly a mouse from a user who uses mainly a keyboard. Also, such user behavior information combined with device-context information such as physical conditions like hardware, network speed and user's ability with the peripheral devices can make such interactions more unique.

Device-context models as well as behavioral models can use machine learning to identify certain types of devices and users (such as through the use of feature vectors). By recording one user's interaction in the same situation many times, it is expected that this user will interact with the computer somewhat similarly each time and also that the interaction differs from the interactions gathered from other users.

For the behavioral dynamics analysis, mouse and keyboard dynamics data can be used as well as touchscreen dynamics can be used too. And, the output of the analysis can be included in the behavior information received in block 404. The output of the analysis can also be used to generate corresponding models used by the system (e.g., see operation at block 410 which uses a model of historical behavior information).

With respect to building a model of historical behavior information, in some embodiments, the system can use user data from a public dataset. The dataset can include realistic instances of insider threats based on a gamified competition.

The dataset can include both mouse and keyboard traces, among others user interactions with computer input devices. The dataset can include both mouse and keyboard data of different users that can be normal users or attackers. Data for the datasets can be continuously collected from users during routine Internet browsing activities in the context of a gamified experiment.

Whether generating the model or a feature vector of a user, a mouse agent or touchscreen agent of the system can collect the position of the cursor in the screen, the action's timestamp, screen resolution, the particular action, and user identification. The mouse or touchscreen actions can include mouse or finger movement, button press and/or release and scroll for example. A keyboard agent can also be used by the system to log characters pressed by the users. The behavior information can also include the timestamp of event, movement type (press and/or release), key and user ID. Both alphanumeric and special keys can be recorded by the system.

Since the users type potentially sensitive information, the data can be provided in an anonymized fashion as well. In some embodiments, a keyboard used by the user can divided into zones to accomplish the anonymization. FIG. 6 shows mapping 600 of a keyboard into three zones to enhance privacy. FIG. 6 shows a keyboard mapping 600 to anonymize sensitive information. In such examples, the system can receive user behavior information that includes interactions of the zones of the keyboard instead of individual interactions with specific keys. This can secure the privacy of user's codes and entries into the keyboard.

At block 406, the method 400 includes generating, by the one or more computing devices, a first feature vector for the device-context information and a second feature vector for the user behavior information. In some embodiments, the operation of block 406 can be performed by the feature vector generator 304.

At block 408, the method 400 includes comparing, by the one or more computing devices, the first feature vector against a first model of historical device-context information from previous sessions of the user or other users. The previous sessions can be related to the session, and the comparison at block 408 provides a first level of deviation of the first feature vector from the first model. In some embodiments, the operation of block 408 can be performed by the device-context information comparator 306a.

At block 410, the method 400 includes comparing, by the one or more computing devices, the second feature vector against a second model of historical user behavior information from the previous sessions. The comparison at block 410 provides a second level of deviation of the second feature vector from the second model. In some embodiments, the operation of block 410 can be performed by the behavior information comparator 306b.

At block 412, the method 400 includes determining, by the one or more computing devices, whether the session is anomalous or normal according to the first level of deviation and the second level of deviation. And, at block 414, the method 400 includes performing, by the one or more computing devices, a security action in response to determining the session is anomalous. In some embodiments, the operation of block 412 can be performed by the analysis circuitry 308. In some embodiments, the operation of block 414 can be performed by one or more components of the AIS 302.

The models used in the operations of blocks 408 and 410 can be based on similar streams of data received for the generation of the feature vectors. And, current or real-time streams of data received as input for the generation of the feature vectors can also be used to update respective models. The first model of historical device-context information can be based on present and previous instances of the information received in block 402. And, the second model of historical behavior information can be based on present and previous instances of the information received in block 404.

In some embodiments, the first model of historical device-context information can be derived based solely on session data obtained from HTTP requests. In such embodiments, since HTTP requests can be spoofed, the second model of behavior information can be derived from complex information that it is based on specific user interactions with an input device (e.g., based on specific user interactions with both a mouse (or touchpad) and a keyboard or based on specific variables of touch interactions with a touchscreen).

In some embodiments, generating the models can include recording usage statistics of the number of times that a user logs in, the day and time of the week at which the user logs in, what type of device and browser used for the logging in, and the country and region from which the user is accessing a website, as well as recording behavior information and statistics. The model generation can also include deriving the models based on the recordings. Platform and browser data can be obtained by parsing a user agent, and geographic data can be obtained by parsing IP addresses. Such information can be recorded as to whether it was obtained from network sessions corresponding to successful logins for a given user.

One of the challenges of building the models is that several device-context variables and behavioral variables are non-numerical. For example, a given browser version or operating system are non-numerical. This is one example reason for generating and using the feature vectors in both the method 400 as well as in generating the models. For instance, each browser model version, each day of the week, each country and region can be parts of a feature vector. But, with the non-numerical factors, the methods disclosed herein can still determine likelihood of a given device-context and user behavior as being anomalous or not.

To overcome the aforementioned challenges, generating the models as well as generating the feature vectors can include computing the ratio of observations in a given field of a category divided by the sum of all the observations in that category. For instance, let c be the number of connections coming from a country K. And, let C be the total number of observations coming from all countries for given users. Then the likelihood of an incoming connection from country K could be computed as c (the number of connections coming from a country K) divided by C (the total number of observations coming from all countries for given users).

In order to assign a probability of 1 to the most likely event within a category, and a relative weight to other events in decreasing order from most likely to least likely, the system can normalize all values within a category. This can occur by ordering fields from most likely to lease likely, and defining a new probability for a given field within a category as the sum of the probabilities for categories with probability equal or less to the one of the given field. For example, consider three countries with the following probabilities based on access frequency: United States=1/2, United Kingdom=1/3, and France=1/6. The normalized probabilities can be calculated as: United States=1, United Kingdom=3/6, and France=1/6.

Figure 8A:
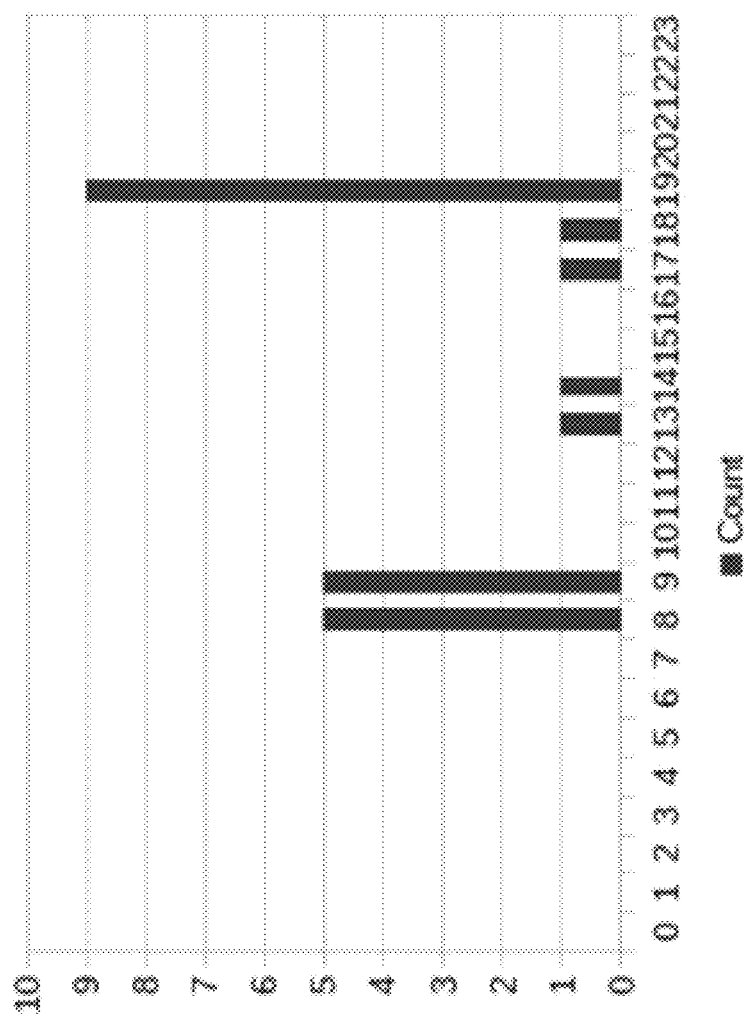
FIGS. 8A and 8B depict an example convolution used for temporal categories (e.g. hour of connection), in accordance with some embodiments of the present disclosure.
Figure 8B:
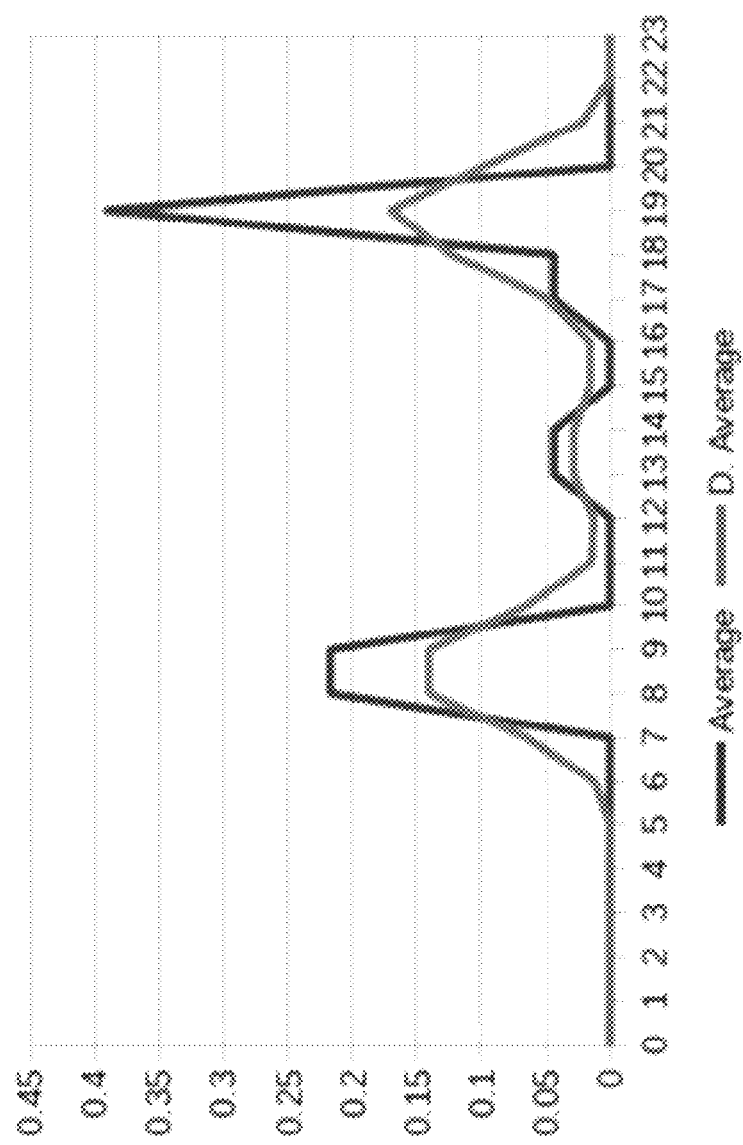

In some embodiments, temporal categories (e.g., hours, days, etc.) can be considered cyclical and approximate. For example, events around midnight (before or after 24:00)

should be considered relatively close to each other since a user is not likely to regularly access a website at an exact time but more likely to access a web site during a range of time. Also, in order to transform non-precise or continuous variables into discrete variables the system can use convolution. FIGS. 8A and 8B should how convolution can be used by the system.

Specifically, FIGS. 8A and 8B depict an example convolution used for different hours of connection to a website, in accordance with some embodiments of the present disclosure. In FIGS. 8A and 8B, shown is a distribution of discrete frequencies of hours of a day of website access for a given user. In the depicted example, 7 PM (or 19:00) is approximately the hour of the day with most access. However, this is close to 8 PM (or 20:00), so it would be appropriate to consider an access at 8 PM relatively normal for this context. Thus, although data represented in FIG. 8A is collected, the data used for the feature vector can more closely resemble the data represented in FIG. 8B, which is an output of a convolution.

In some embodiments, feature vectors can be generated for a session login attempt and the features vectors can include normalized probabilities and/or data derived from convolution. Each variable in a feature vector gathered from access of a website by a user (such as each variable in a feature vector retrieved from an HTTP request) can either be transformed via normalization and/or convolution.

In some embodiments, the models can be improved in their effectiveness at pointing out abnormal access via machine learning. The models can be trained using probability profiles for each user based on a user's access history and other users' access history. The training can occur through use of random forests. Each instance of website access in access history for a user can be represented by one or more feature vectors. A collection of feature vectors through time can be used to generate a user probability profile and then a new feature vector for a new instance of access can be compared against the user probability profile to determine whether that new access event is normal or anomalous. For instance, the system can evaluate a set of new logins against the user probability profile and compute the feature vector for each visit. Each one of the feature vectors can then be fed to one or more random forests of the user probability profile to assess whether or not the visits are how anomalous or to what extent are the visits anomalous.

Also, in some embodiments, if spoofing is discovered (or simulated), impersonation records can be part of the user probability profile as well. Such impersonation records can also be part of the models or the models can be partially derived from the impersonation records. The models can be generated by comparing login events from one user to the history of that user or other users. The models can be or include a collection of assessments of the likelihood of an impersonation or spoofing in access events. And, the models can include statistics and such statistics can be updated with each new access by a user.

In some embodiments, the behavioral dynamics recorded for use in generation of the second feature vector for behavior information include a combination of keystrokes and mouse activity. Alternatively, the behavioral dynamics recorded for use in generation of the second feature vector for behavior information can include variables related to user interaction with a touchscreen. Either of these types of behavioral dynamics are sufficient to describe human-computer interactions and for determining whether spoofing is occurring. In some embodiments, to describe a user behavior during a session the system can calculate the keyboard and mouse dynamics as behavioral features such as the variable features shown in FIGS. 5 and 6. FIG. 5 is an illustration of an example space segmentation 500 to calculate mouse movement features that can be a part of the behavior information, in accordance with some embodiments of the present disclosure. FIG. 6 is an illustration of an example keyboard mapping 600 to anonymize sensitive information, in accordance with some embodiments of the present disclosure.

In some embodiments, the system can use all the gathered keyboard and mouse events in one single session. A session can be defined as a time frame where the user is performing any activity on the computer (such as a login event). Once the keyboard and mouse dynamics of a session are calculated, the generated data can be combined into one feature vectors. The combination of both set of features describes the use of keyboard and mouse dynamics in a single session. This process can be repeated each time a new session is gathered.

In some embodiments, to compare a feature vector for behavior and/or a feature vector for device context against the historical data in the models, the system can define a maximum number of sessions to compare. This allows to test the models' performance with respect to history length. In such embodiments, the system can calculate a history mean by using the equation shown in FIG. 9 (hereinafter referred to as the equation 900). The "FeatureHistMean$_j$" variable shown in the equation 900 can be defined as the history mean of one feature. The "FeatureHist$_j$" variable shown in the equation 900 can be defined as the individual observation of the feature, and "J" is the number of observations in the history.

To compare the gathered session against user session history the equation in FIG. 10 can be used by the system (hereinafter referred to as the equation 1000). The "FeatureHistMean$_i$" variable shown in the equation 1000 can be defined as the calculated mean of the feature. And, the "σ(FeatureHist$_i$)" in the equation 1000 can be the feature's standard deviation. The resulting vectors of deviations (shown as "FeatureDist$_i$" in the equation 1000) can provide the extent or level of deviation of a given session compared to corresponding history of similar sessions.

Also, in using the equation 900 and equation 1000, the system can generate a dataset of sessions with labeled data. The system can generate positive labels for elements of the dataset of sessions that indicate normal or a level of normal access. The system can also generate negative labels for elements of the dataset of sessions that indicate anomalous or a level of anomalous access. From the labeled data, the system can further calculate behavioral features and deviation vectors. Such behavioral features and deviation vectors can further enhance the determination of whether a session is anomalous or not (e.g., see the determination in block 412). The resulting vectors with positive and negative labels can be fed to random forests to even further enhance the determination of whether a session is anomalous or not. Also, alternatively, other forms of machine learning can be used instead of random forests.

In some examples, the models can be further based on feature vectors derived from sessions of attackers or spoofing entities. In some cases, sessions of attackers can include instances where attackers have gained access to authentication credentials of legitimate users (e.g., login and password of legitimate user). In some cases, session of attackers can include the attackers guessing and sending device-context information and/or behavior information. Attackers can use educated guesses on behavior patterns and device-context patterns. Attackers can guess on the time of the day in which a user usually connects, the operating system used, the browser used and IP range from which legitimate users connect. The system can assume that an attacker can employ one or more strategies to impersonate a legitimate user. The attack strategies can include a simple attack (the attacker connects to the webservice from a machine different than the legitimates user's machine), a context simulation attack (the attacker connects to the webservice from a machine different than the legitimates user's machine, but tries to replicate or guess the victim's access patterns—patterns of use of OS type, browser type, IP range and time of the day similar to a legitimates user's access patterns), a physical access to legitimates user's machine (an attacker connects from the legitimates user's machine, thereby having replicated a legitimates user's context, and attempts at impersonating the legitimates user). To combat such attacks, the system can include generating the models that exclude data generated by discovered attack strategies. Also, it is especially difficult for most attackers to spoof behavior information (e.g., keyboard and mouse usage features or touchscreen interaction features). Thus, models including feature vectors with specific elements of behavior information as well as some device-context information can be sufficient in limiting most attacks and spoofing.

Figure 11:
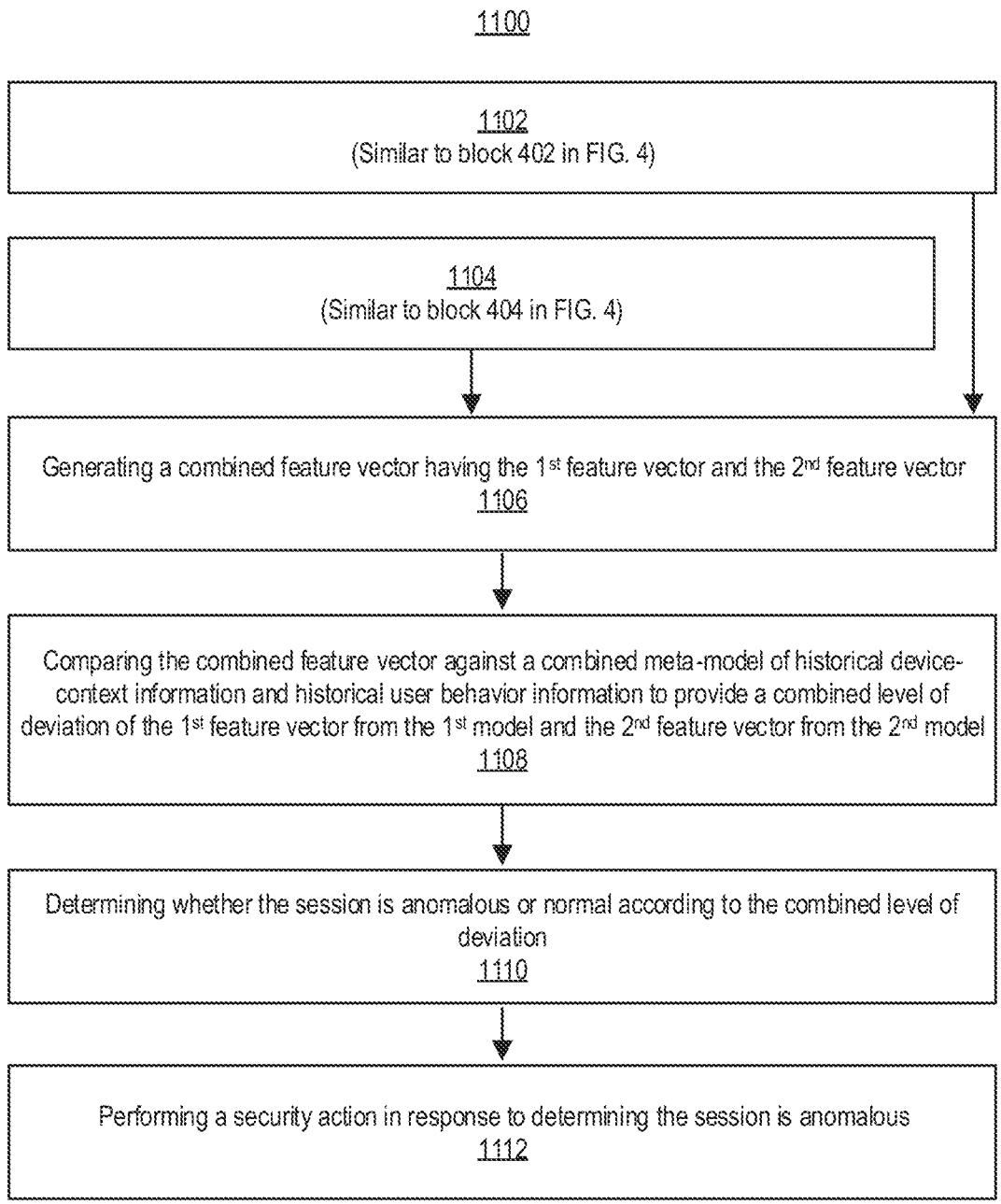

FIG. 11 is another flow diagram of an example method 1100 for implementing anti-impersonation using device-context information and user behavior information from a session as well as a combined feature vector having both types of information, in accordance with some embodiments of the present disclosure.

At block 1102, the method 1100 includes receiving from a client computer, by one or more computing devices, device-context information from a session. At block 1104, the method 1100 includes receiving from the client computer, by the one or more computing devices, user behavior information from the session. As shown in FIG. 11, the blocks 1102 and 1104 are similar to blocks 402 and 404 in FIG. 4.

At block 1106, the method 1100 includes generating, by the one or more computing devices, a combined feature vector including the first feature vector and the second feature vector.

At block 1108, the method 1100 includes comparing, by the one or more computing devices, the combined feature vector against a combined meta-model of the historical device-context information and the historical user behavior information from the previous sessions. The comparison at block 1108 provides a combined level of deviation of the first feature vector from the first model and the second feature vector from the second model.

At block 1110, the method 1100 includes determining, by the one or more computing devices, whether the session is anomalous or normal according to the combined level of deviation. And, at block 1112, the method 1100 includes performing, by the one or more computing devices, a security action in response to determining the session is anomalous.

In some embodiments, the system includes a single model to assess the risk of a session based on the device-context information as well as behavior information. The device-context information can include HTTP information (or other types of browser based information) and sessions can include authentication sessions on websites. In some embodiments, the sessions only include login sessions. In some embodiments, the system can include a single model for browser-context information specifically and behavior information. And, in some embodiments, the system can include respective models for browser-context information and behavior information.

The single model can be generated in different ways. For example, the single model can be generated into a combined meta-model. For example, the system can build the model based on a decision tree that takes the scores produced by the single models and decides whether a given session should be considered suspicious or not. Also, for example, the single model can be a parametric linear combination of the scores.

The system can define $\hat{y}_c, \hat{y}_b \in [0,1]$ as the prediction of device-context and behavior based models, respectively. The system can unify the models' prediction using a linear convex combination as provided by $\hat{y}_t = \alpha_c \hat{y}_c + \alpha_b \hat{y}_b$, and where $\alpha_c, \alpha_b \in [0,1]$ are the coefficient parameters of each model. In such examples, the summation of the coefficient parameters equals one or one hundred percent, e.g., a, $\alpha_c + \alpha_b = 1$. This makes the calculations a meaningful prediction where $\hat{y}_t \in [0,1]$. By taking into account several learned features of device context (such as features of browser context) and behavioral dynamics, the system can gain confidence on the legitimacy of a given log-in attempt or other type of session compared against the combined model.

Figure 12:
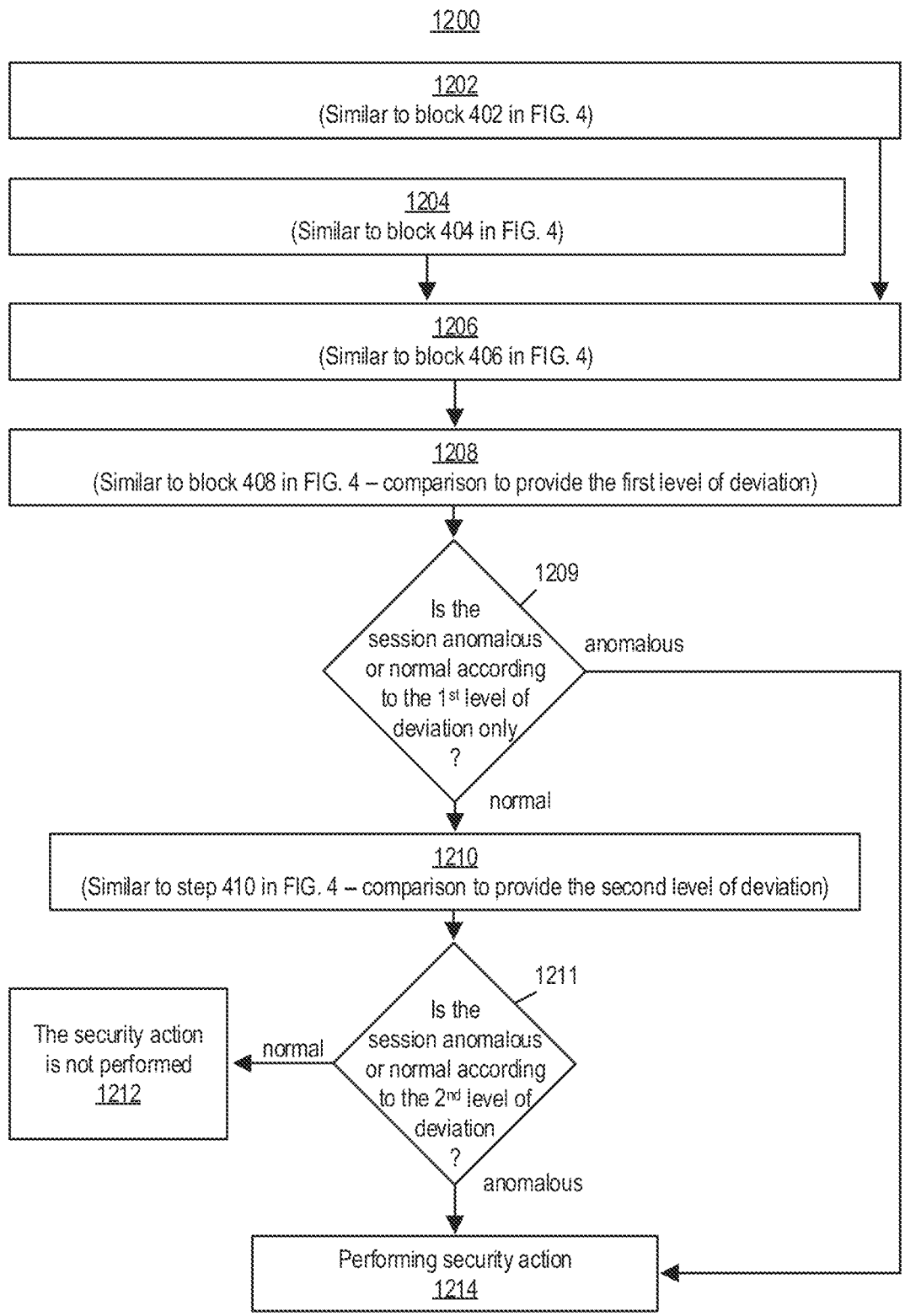

FIG. 12 is another flow diagram of an example method 1200 for implementing anti-impersonation wherein comparing of a first feature vector of device-context information against a first model occurs prior to comparing a second feature vector of behavior information against a second model, in accordance with some embodiments of the present disclosure.

At block 1202, the method 1200 includes receiving from a client computer, by one or more computing devices, device-context information from a session. At block 1204, the method 1200 includes receiving from the client computer, by the one or more computing devices, user behavior information from the session. At block 1206, the method 1200 includes generating, by the one or more computing devices, a first feature vector for the device-context information and a second feature vector for the user behavior information. At block 1208, the method 1200 includes comparing, by the one or more computing devices, the first feature vector against a first model of historical device-context information from previous sessions of the user or other users. The comparison at block 1208 provides a first level of deviation of the first feature vector from the first model. At block 1210, the method 1200 includes comparing, by the one or more computing devices, the second feature vector against a second model of historical user behavior information from the previous sessions. The comparison at block 1210 provides a second level of deviation of the second feature vector from the second model.

As shown in FIG. 12, the blocks 1202, 1204, 1206, 1208 and 1210 are similar to blocks 402, 404, 406, 408 and 410 in FIG. 4. A difference between method 1200 and method 400 is that in method 1200 the comparing the first feature vector against the first model to provide the first level of deviation always occurs prior to the comparing the second feature vector against the second model to provide the second level of deviation.

At block 1209, the method 1200 includes determining, by the one or more computing devices, whether the session is anomalous or normal according to the first level of deviation only. In response to determining the session is normal (i.e., not anomalous), the method continues with block 1210, which is the comparing the second feature vector against the second model of historical user behavior information from the previous sessions to provide the second level of deviation. In response to determining the session is anomalous at block 1209, the method continues with block 1214 which includes performing a security action. At block 1214, the method 1200 can include performing the security action without the determination that the session is anomalous or normal according to the second level of deviation, in response to determining the session is anomalous according to the first level of deviation.

At block 1211, the method 1200 includes determining, by the one or more computing devices, whether the session is anomalous or normal according to the second level of deviation. In response to determining the session is normal (i.e., not anomalous) at block 1211, the method continues with block 1212, wherein the security is not performed. In response to determining the session is anomalous at block 1211, the method continues with block 1214 which includes performing a security action. At block 1214, the method 1200 can include performing the security action in response to determining that the session is anomalous according to the second level of deviation.

Figure 13:
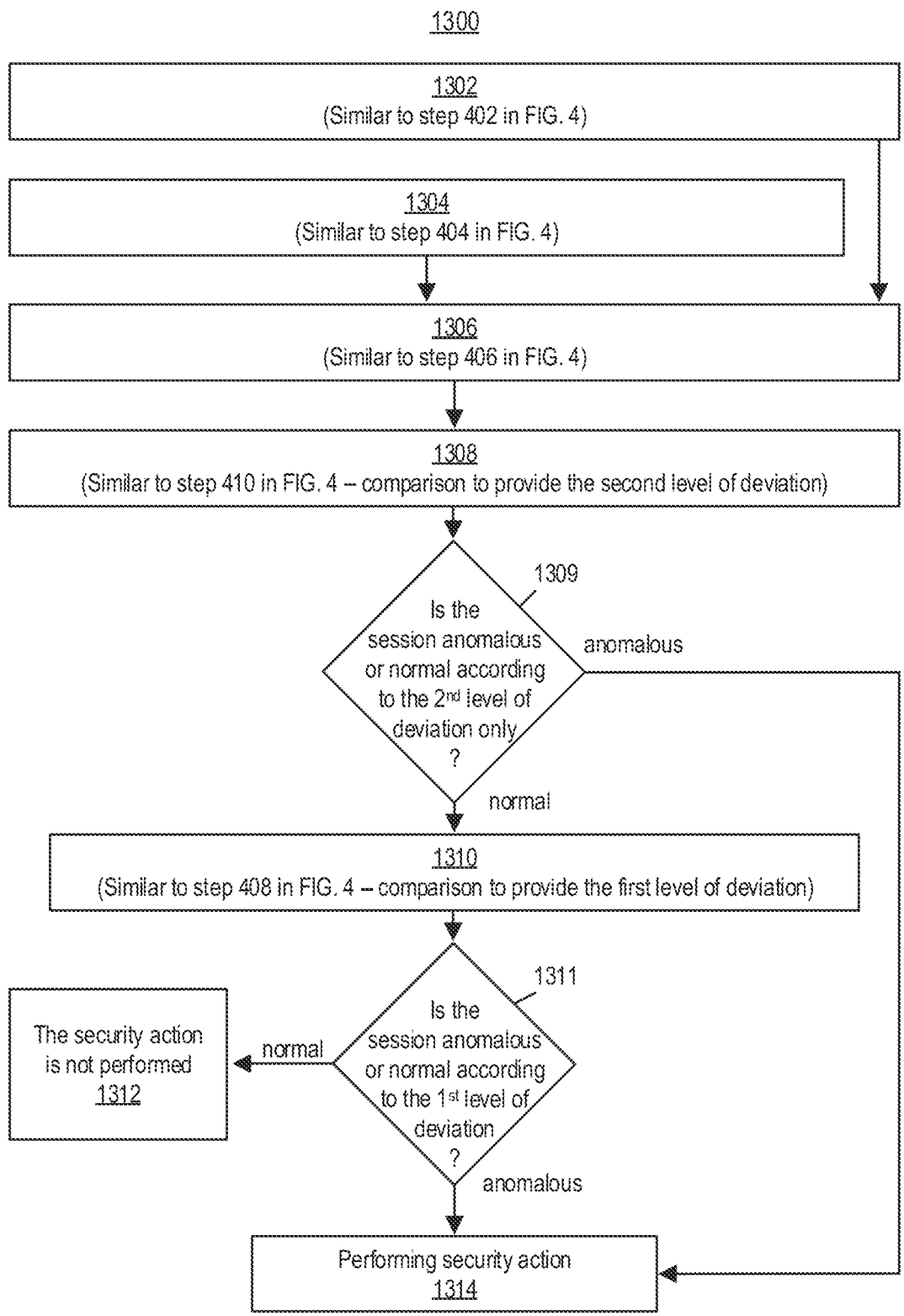

FIG. 13 is another flow diagram of an example method 1300 for implementing anti-impersonation wherein comparing of a second feature vector of behavior information against a second model occurs prior to the comparing a first feature vector of device-context information against a first model, in accordance with some embodiments of the present disclosure.

At block 1302, the method 1300 includes receiving from a client computer, by one or more computing devices, device-context information from a session. At block 1304, the method 1300 includes receiving from the client computer, by the one or more computing devices, user behavior information from the session. At block 1306, the method 1300 includes generating, by the one or more computing devices, a first feature vector for the device-context information and a second feature vector for the user behavior information. At block 1308, the method 1300 includes comparing, by the one or more computing devices, the second feature vector against a second model of behavior information from previous sessions of the user or other users. The comparison at block 1308 provides a second level of deviation of the second feature vector from the second model. At block 1310, the method 1300 includes comparing, by the one or more computing devices, the first feature vector against a first model of historical device-context information from the previous sessions. The comparison at block 1310 provides a first level of deviation of the first feature vector from the first model.

As shown in FIG. 13, the blocks 1302, 1304, and 1306 are similar to blocks 402, 404, and 406 in FIG. 4. And, block 1308 is similar to block 410 in FIG. 4, and block 1310 is similar to block 408 in FIG. 4. A difference between method 1300 and method 400 is that in method 1300 the comparing the second feature vector against the second model to provide the second level of deviation always occurs prior to the comparing the first feature vector against the first model to provide the first level of deviation.

At block 1309, the method 1300 includes determining, by the one or more computing devices, whether the session is anomalous or normal according to the second level of deviation only. In response to determining the session is normal (i.e., not anomalous), the method continues with block 1310, which is the comparing the first feature vector against the first model of historical device-context information from the previous sessions to provide the first level of deviation. In response to determining the session is anomalous at block 1309, the method continues with block 1314 which includes performing a security action. At block 1314, the method 1300 can include performing the security action without the determination that the session is anomalous or normal according to the first level of deviation, in response to determining the session is anomalous according to the second level of deviation.

At block 1311, the method 1300 includes determining, by the one or more computing devices, whether the session is anomalous or normal according to the first level of deviation. In response to determining the session is normal (i.e., not anomalous) at block 1311, the method continues with block 1312, wherein the security is not performed. In response to determining the session is anomalous at block 1311, the method continues with block 1314 which includes performing a security action. At block 1314, the method 1300 can include performing the security action in response to determining that the session is anomalous according to the first level of deviation.

Figure 14:
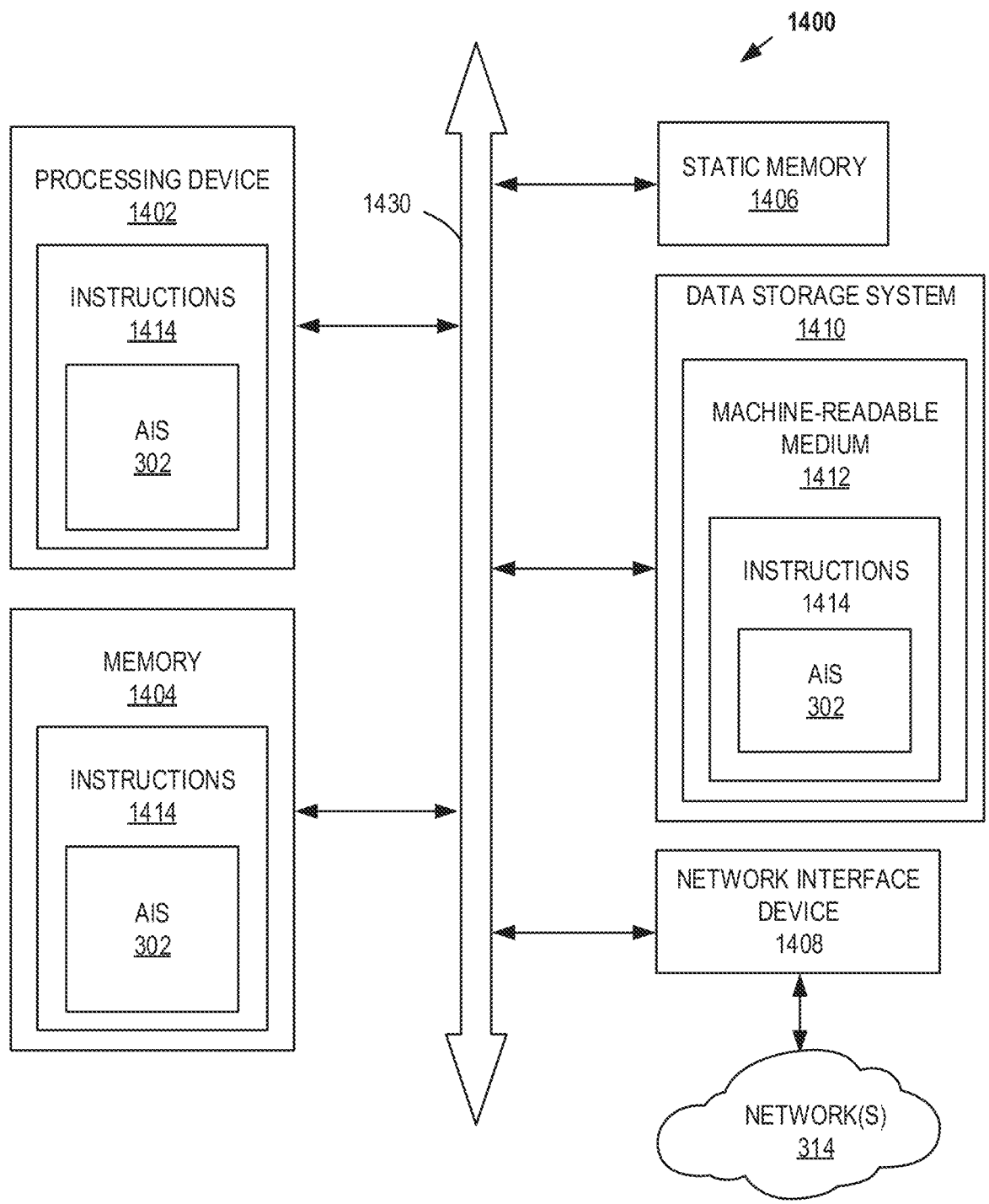
FIG. 14 is a block diagram of example aspects of an example computer system, in accordance with some embodiments of the present disclosure.

FIG. 14 is a block diagram of example aspects of an example computer system 1400, in accordance with some embodiments of the present disclosure. FIG. 14 illustrates parts of the computer system 1400 within which a set of instructions, for causing the machine to perform any one or more of the methodologies discussed herein, can be executed. In some embodiments, the computer system 1400 can correspond to a host system that includes, is coupled to, or utilizes memory or can be used to perform the operations of a controller (e.g., to execute an operating system to perform operations corresponding to the AIS 302). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1400 includes a processing device 1402, a main memory 1404 (e.g., read-only memory (ROM), flash memory, dynamic random-access memory (DRAM), etc.), a static memory 1406 (e.g., flash memory, static random-access memory (SRAM), etc.), and a data storage system 1410, which communicate with each other via a bus 1430.

The processing device 1402 represents one or more general-purpose processing devices such as a microprocessor, a central processing unit, or the like. More particularly, the processing device can be a microprocessor or a processor implementing other instruction sets, or processors implementing a combination of instruction sets. The processing device 1402 can also be one or more special-purpose processing devices such as an application specific integrated circuit (ASIC), a field programmable gate array (FPGA), a digital signal processor (DSP), network processor, or the like. The processing device 1402 is configured to execute instructions 1414 for performing the operations discussed herein, such as operations associated with the AIS 302. The computer system 1400 can further include a network interface device 1408 to communicate over the LAN/WAN network(s) 314 of FIG. 3.

The data storage system 1410 can include a machine-readable storage medium 1412 (also known as a computer-readable medium) on which is stored one or more sets of instructions 1414 or software embodying any one or more of the methodologies or functions described herein, such as operations associated with the AIS 302. The instructions 1414 can also reside, completely or at least partially, within the main memory 1404 and/or within the processing device 1402 during execution thereof by the computer system 1400, the main memory 1404 and the processing device 1402 also constituting machine-readable storage media.

In one embodiment, the instructions 1414 include instructions to implement functionality corresponding to the AIS 302. While the machine-readable storage medium 1412 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a predetermined desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
receiving from a client computer, by one or more computing devices, device-context information from a session, wherein the session includes a time period where a user of the client computer is performing an activity on the client computer;
receiving from the client computer, by the one or more computing devices, user behavior information from the session, wherein the user behavior information comprises information on ways the user uses user input devices for the client computer during the session;
generating, by the one or more computing devices, a first feature vector for the device-context information and a second feature vector for the user behavior information;
comparing, by the one or more computing devices, the first feature vector against a first model of historical device-context information from previous sessions of the user or other users, wherein the previous sessions relate to the session, and wherein the comparison of the first feature vector against the first model provides a first level of deviation of the first feature vector from the first model;
comparing, by the one or more computing devices, the second feature vector against a second model of historical user behavior information from the previous sessions, wherein the comparison of the second feature vector against the second model provides a second level of deviation of the second feature vector from the second model, the first level of deviation and the second level of deviation compensating a possibility of a false positive authentication effect of each other;

determining, by the one or more computing devices, whether the session is anomalous or normal according to the first level of deviation and the second level of deviation; and performing, by the one or more computing devices, a security action in response to determining the session is anomalous.

2. The method of claim 1, further comprising:

generating, by the one or more computing devices, a combined feature vector comprising the first feature vector and the second feature vector;

comparing, by the one or more computing devices, the combined feature vector against a combined meta-model of the historical device-context information and the historical user behavior information from the previous sessions, wherein the comparison of the combined feature vector against the combined meta-model provides a combined level of deviation of the first feature vector from the first model and the second feature vector from the second model; and determining, by the one or more computing devices, whether the session is anomalous or normal according to the combined level of deviation.

3. The method of claim 1, wherein the comparing the first feature vector against the first model to provide the first level of deviation occurs prior to the comparing the second feature vector against the second model to provide the second level of deviation, and wherein the method comprises:

determining, by the one or more computing devices, whether the session is anomalous or normal according to the first level of deviation only; and performing the security action, without the determination that the session is anomalous or normal according to the second level of deviation, in response to determining the session is anomalous according to the first level of deviation.

4. The method of claim 1, wherein the comparing the second feature vector against the second model to provide the second level of deviation occurs prior to the comparing the first feature vector against the first model to provide the first level of deviation, and wherein the method comprises:

determining, by the one or more computing devices, whether the session is anomalous or normal according to the second level of deviation only; and performing the security action, without the determination that the session is anomalous or normal according to the first level of deviation, in response to determining the session is anomalous according to the second level of deviation.

5. The method of claim 1, further comprising:

generating, by the one or more computing devices, a parametric linear combination according to the first level of deviation and the second level of deviation; and determining, by the one or more computing devices, whether the session is anomalous or normal according to the parametric linear combination.

6. The method of claim 5, wherein the parametric linear combination comprises a prediction of the first model and a prediction of the second model, and wherein the predictions of the models are defined by $\hat{y}_{t\,c}, \hat{y}_{t\,b} \in [0,1]$.

7. The method of claim 6, further comprising unifying the predictions of the models using a linear convex combination, wherein the linear convex combination is defined by $\hat{y}_{t\,f} = \alpha_c \hat{y}_{t\,c} + \alpha_b \hat{y}_{t\,b}$, and wherein $\alpha_c, \alpha_b \in [0,1]$ are coefficient parameters of each model.

8. The method of claim 7, wherein a summation of the coefficient parameters equals one or one hundred percent.

9. The method of claim 1, further comprising generating each one of the first and second models using machine learning.

10. The method of claim 9, further comprising generating each one of the first and second models using random decision forests.

11. The method of claim 9, wherein the generating the first and second models comprises generating a respective set of ratios of observations for each of the first and second models, and wherein each ratio of observations for a field of a feature category is divided by a summation of all observations of the feature category.

12. The method of claim 11, further comprising normalizing each ratio of observations in the first and second models.

13. The method of claim 11, further comprising, for each of the feature category that is cyclical, determining closeness of different fields in the feature category using convolution.

14. The method of claim 13, wherein the cyclical feature categories comprise temporal categories.

15. The method of claim 1, further comprising:

updating the first model according to the first feature vector; and updating the second model according to the second feature vector.

16. The method of claim 15, wherein the updating of the first and second models occur after the comparing the first feature vector against the first model and the comparing of the second feature vector against the second model.

17. The method of claim 1, wherein the session comprises a login session.

18. The method of claim 1, wherein the session consists of a login session.

19. A non-transitory computer-readable storage medium comprising instructions that, when executed by a processing device, cause the processing device to:

receive, from a client computer, device-context information from a session, wherein the session includes a time period where a user of the client computer is performing an activity on the client computer;

receive, from the client computer, user behavior information from the session, wherein the user behavior information comprises information on ways the user uses user input devices for the client computer during the session;

generate a first feature vector for the device-context information and a second feature vector for the user behavior information;

compare the first feature vector against a first model of historical device-context information from previous sessions of the user or other users, wherein the previous sessions relate to the session, and wherein the comparison of the first feature vector against the first model provides a first level of deviation of the first feature vector from the first model;

compare the second feature vector against a second model of historical user behavior information from the previous sessions, wherein the comparison of the second feature vector against the second model provides a second level of deviation of the second feature vector from the second model, the first level of deviation and the second level of deviation compensating a possibility of a false positive authentication effect of each other;

determine whether the session is anomalous or normal according to the first level of deviation and the second level of deviation; and perform a security action in response to determining the session is anomalous.

20. A computer system, comprising:

a processing device; and memory in communication with the processing device and storing instructions that, when executed by the processing device, cause the processing device to:

receive, from a client computer, device-context information from a session, wherein the session includes a time period where a user of the client computer is performing an activity on the client computer;

receive, from the client computer, user behavior information from the session, wherein the user behavior information comprises information on ways the user uses user input devices for the client computer during the session;

generate a first feature vector for the device-context information and a second feature vector for the user behavior information;

compare the first feature vector against a first model of historical device-context information from previous sessions of the user or other users, wherein the previous sessions relate to the session, and wherein the comparison of the first feature vector against the first model provides a first level of deviation of the first feature vector from the first model;

compare the second feature vector against a second model of historical user behavior information from the previous sessions, wherein the comparison of the second feature vector against the second model provides a second level of deviation of the second feature vector from the second model, the first level of deviation and the second level of deviation compensating a possibility of a false positive authentication effect of each other;

determine whether the session is anomalous or normal according to the first level of deviation and the second level of deviation; and perform a security action in response to determining the session is anomalous.

\* \* \* \* \*